United States Patent
Peeters et al.

(10) Patent No.: US 10,176,021 B1
(45) Date of Patent: Jan. 8, 2019

(54) SYSTEM AND METHOD FOR MANAGING ACTUAL PROCESSING CAPACITY USAGE ON A MAINFRAME COMPUTER

(71) Applicant: CA, Inc., Islandia, NY (US)

(72) Inventors: Johannes Gerardus Jozef Peeters, Jade (DE); Friedhelm Herbert Stoehler, Augsburg (DE); Horst Walter Doehler, Untermerzbach-Memmelsdorf (DE)

(73) Assignee: CA, Inc., Islandia, NY (US)

( * ) Notice: Subject to any disclaimer, the term of this patent is extended or adjusted under 35 U.S.C. 154(b) by 0 days.

(21) Appl. No.: 14/949,615

(22) Filed: Nov. 23, 2015

Related U.S. Application Data

(60) Provisional application No. 62/082,817, filed on Nov. 21, 2014.

(51) Int. Cl.
*G06F 9/48* (2006.01)
*G06F 9/50* (2006.01)

(52) U.S. Cl.
CPC .......... *G06F 9/5077* (2013.01); *G06F 9/4887* (2013.01); *G06F 2209/485* (2013.01); *G06F 2209/504* (2013.01)

(58) Field of Classification Search
None
See application file for complete search history.

(56) References Cited

U.S. PATENT DOCUMENTS

| | | | |
|---|---|---|---|
| 6,587,938 B1* | 7/2003 | Eilert | G06F 9/5061 712/13 |
| 6,859,926 B1* | 2/2005 | Brenner | G06F 9/5038 718/100 |
| 7,096,469 B1* | 8/2006 | Kubala | G06F 9/5077 718/100 |
| 7,752,415 B2* | 7/2010 | Vaupel | G06F 9/5077 711/173 |
| 2014/0237476 A1* | 8/2014 | Steffen | G06F 9/505 718/103 |
| 2015/0095089 A1* | 4/2015 | Ginis | G06Q 10/06312 705/7.22 |

* cited by examiner

*Primary Examiner* — Lewis A Bullock, Jr.
*Assistant Examiner* — Bruce S Ashley
(74) *Attorney, Agent, or Firm* — Alliance IP, LLC

(57) ABSTRACT

Actual capacity usage limits for one or more logical partitions or groups of logical partitions are managed based on hardware-specific determinations of actual capacity usage.

7 Claims, 18 Drawing Sheets

| WLM: | IMP0 | IMP1 | IMP2 | IMP3 | IMP4 | IMP5 | Disc |
|---|---|---|---|---|---|---|---| z/OS Workload

FIG. 2

| WLM: | IMP0 | IMP1 | IMP2 | IMP3 | IMP4 | IMP5 | Disc |
|---|---|---|---|---|---|---|---|
| CICSPROD | | | | | | | |
| SYSTEM | ■ | | | | | | |
| SYSSTC | | ■ | | | | | |
| DDFPROD | | | ■ | 2 | | | |
| DDFTEST | | | 1 | | 1 | | |
| BATPROD | | | | 1 | 2 | | |
| BATMED | | | | | 1 | 2 | 2 |
| BATLOW | | | ■ | | | 1 | |
| STC_H | | | | | | | |
| STC_M | | | | 1 | 2 | | 2 |
| STC_L | | | | | 1 | 2 | |

Service Class

| WLM: | IMP0 | IMP1 | IMP2 | IMP3 | IMP4 | IMP5 | Disc |
|---|---|---|---|---|---|---|---|
| | | Time Critical | | | | Not Time Critical | |
| CICSPROD | | | ▨ | | | | |
| SYSTEM | ▨ | | | | | | |
| SYSSTC | | ▨ | | | | | |
| DDFPROD | | | | | | | |
| DDFTEST | | | 1 | 2 | | | |
| BATPROD | | | | 1 | 1 | | |
| BATMED | | | | | 2 | 2 | |
| BATLOW | | | | | 1 | 1 | 2 |
| STC_H | | | ▨ | | | | |
| STC_M | | | | 1 | 2 | | 2 |
| STC_L | | | | | 1 | 2 | |

Services Classes

| WLM: | IMP0 | IMP1 | IMP2 | IMP3 | IMP4 | IMP5 | Disc |
|---|---|---|---|---|---|---|---|
| CICSPROD | | | ▨ | | | | |
| SYSTEM | ▨ | | | | | | |
| SYSSTC | | ▨ | | | | | |
| DDFPROD | | | ▨ 1 | ▨ 2 | | | |
| DDFTEST | | | | | ▨ 1 | | ▨ 2 |
| BATPROD | | | | ▨ 1 | ▨ 2 | ▨ 2 | |
| BATMED | | | | | ▨ 1 | ▨ 1 | |
| BATLOW | | | ▨ | | | | ▨ 2 |
| STC_H | | | | | | | |
| STC_M | | | | ▨ 1 | ▨ 2 | | |
| STC_L | | | | | ▨ 1 | ▨ 2 | |

▨ Time Critical    ▨ Not Time Critical

FIG. 5

| Processor | Number of CPUs | MSU | MSU/CPU |
|---|---|---|---|
| 2827-401 | 1 | 30 | 30 |
| 2827-402 | 2 | 58 | 29 |
| 2827-407 | 7 | 183 | 26 |
| 2827-501 | 1 | 80 | 80 |
| 2827-502 | 2 | 150 | 75 |
| 2827-507 | 7 | 470 | 67 |
| 2827-601 | 1 | 119 | 119 |
| 2827-602 | 2 | 222 | 111 |
| 2827-607 | 7 | 695 | 99 |
| 2827-701 | 1 | 188 | 188 |
| 2827-702 | 2 | 352 | 176 |
| 2827-707 | 7 | 1092 | 156 |
| 2827-710 | 10 | 1473 | 147 |
| 2827-724 | 24 | 2940 | 123 |
| 2827-733 | 33 | 3760 | 114 |

FIG. 8

SYSTEM AND METHOD FOR MANAGING ACTUAL PROCESSING CAPACITY USAGE ON A MAINFRAME COMPUTER

FIELD OF THE INVENTION

The present invention relates to reallocating and balancing actual computing capacity on a mainframe computer system.

BACKGROUND OF THE INVENTION

In the early days of modern computing, the large size and cost of computers tended to result in a concentration of computer equipment in large data centers. Most commercial users of computers would have paid one or more data center operators to perform their computing tasks. Over the past decades, miniaturization and cost decreases have driven a trend toward more commercial computer users owning and operating their own computer systems. This trend is not universal, however.

One exception includes those computer users whose computing needs are particularly massive and/or require exceptional reliability, redundancy or security. Examples of such users include very large corporations, and especially financial sector corporations such as banks, exchanges, brokerages and the like. These types of corporations will often contract with third-party providers to supply their computing needs.

The preeminent example of a third party provider of computing services is the International Business Machines (IBM) Corporation. IBM has several thousand users who pay for the capability and reliability of its System z ("z" standing for "zero downtime") computing platform. The way users rely on the performance of the workload on the System z platform is illustrative background for the present invention's system and method for managing computer usage.

In today's rapidly changing information technology (IT) environments, the larger companies often buy or lease the zSeries hardware and have their own z-platform specialists, whereas smaller companies looking for the same reliability and performance often turn to third parties that run data center(s) and offer the usage of their hardware (such a third party is referred to herein as a "provider" or "outsourcer"; a company using third party hardware/services is referred to as the "customer"). The provider/outsourcer often also offers the services of its z-platform specialists to the customers. Normally the customer pays for a predetermined maximum actual processing capacity each month, where the following normally apply:

The maximum processing capacity is related to the actual processing capacity usage at any given time, not to any average usage over time.

It is the obligation of the provider to guarantee that the predetermined maximum computing capacity is available to the customer at any time.

If the predetermined maximum capacity was calculated too low and additional capacity is needed, then additional payments by the customer are necessary.

If the capacity that was predetermined is not used entirely, there is no reimbursement for unused capacity.

With the introduction of "absolute capping" on the hardware zEC12 and zBC12 in 2013, IBM offers an effective method for limiting actual processing capacity usage for logical partitions, helpful for customers of third party providers/outsourcers that bill based thereon. Values for absolute capping are expressed in terms of $\frac{1}{100}^{th}$ of a processor, ranging from 0.01 (1% of a processor) to 255 (255 processors).

Each group of logically-related computing functions being performed for a user is referred to as a logical partition (LPAR). All logical partitions together constitute the total workload of a customer. Workload itself enters the system using a "service class". Within each service class the workload is allocated to one of multiple workload importance levels, e.g. the first part of the workload to a high class, but the longer the workload takes to execute, the lower the workload importance level gets. Different parts of a service class definition are called "periods". When classifying service classes, the following factors are important:

How time critical is the workload
    Workload that is most time critical runs in service classes that are assigned to importance level 0 (IMP0), then importance level 1 (IMP1) etc. until the workload that is least time critical is assigned to importance level 6 (IMP6, Discretionary).

Which performance goal does the user want the workload to achieve?
    Within each service class users can define a performance goal, e.g. by defining that a percentage of the workload is expected to be finished within a certain time or using a certain defined processing capacity only (e.g. the user could define that 90% of the online transactions should be finished within 0.01 seconds (clock time))

While manual intervention gives customers and providers some ability to manage workload performance and costs incurred, with the recent introduction of absolute capping further improvements are possible.

SUMMARY OF THE INVENTION

In view of the foregoing, it is an object of the present invention to provide improved systems and methods for managing actual capacity usage of a mainframe computer system. From the above it can be derived that it is in the interest of the customer to use the capacity that is being paid for the best possible way:

Making sure that the available capacity is used and no money is wasted due to over-allocation.

Making sure that the peak usage is determined by workload that really needs to run during that time.

The available absolute capping offered by IBM suffers not only from the disadvantage of being a manual, static adjustment, but also from the processing capacity of a processor (and hence portions thereof) not being a fixed value. Instead, the processing capacity of a processor is highly dependent on the hardware model.

According to a method aspect of the present invention, a method for managing mainframe computer system usage includes establishing a group definition for all logical partitions of a customer (the customer group). These logical partitions may or may not be spread over different physical machines (CECs—Central Electronic Complexes). The group definition includes a maximum actual processing capacity limit, typically equal to the predetermined actual processing capacity for the month.

According to another aspect of the present invention, the customer group definition may consist of singularly defined logical partitions only, of two or more sub groups, each containing definitions of sub groups or logical partitions, or of a combination of sub groups and singularly defined logical partitions. The customer group and sub group definition(s) will include a maximum value for the actual processing capacity.

According to another aspect, the definition of each logical partition includes:
- a starting value for the actual processing capacity
- a maximum value for the actual processing capacity
- a relative importance parameter, indicating in which order processing capacity may be shifted from one logical partition to another and
- a time criticality level, either for each workload importance level or for each service class period.

According to another aspect, the actual processing capacity usage of the customer group as a total and of the workload that is defined as time critical is monitored and the following situations may come up:
- The hardware set up has changed
  - The absolute capping values need to be recalculated
- Capacity calculation is done as follows:
  - Extrapolation of how much capacity is needed in the next period to execute the workload on each logical partition, starting with the most time critical workload, until the extrapolation finishes with the workload that is not time critical.
  - If all LPARs have the same relative importance "capacity balancing" is done:
    - Add the calculated capacities for each logical partition, first allocating all capacities needed for the highest level of time criticality for an LPAR, then the second highest level of time criticality, etc., until there is no capacity left or until the leftover capacity can be spread over the rest of the LPARs in proportion to their usage.
  - If the LPARs have different relative importance "capacity reallocation" is done:
    - Starting with the LPAR that has the highest relative importance and repeating it for each LPAR in the order of their relative importance: Calculate how much capacity is needed for TC workload and compare to the actual MSU allocation.
      - If the actual MSU allocation suffices to execute the time critical workload: no changes, even if that means there is still substantial capacity 'left over'
      - If the actual MSU allocation does not suffice to execute at least the workload that is time critical: add enough capacity to cover for the TC workload
    - If there is any left over capacity:
      - Starting with the LPAR that has the highest relative importance and repeating it for each LPAR in the order of their relative importance:
        - If more capacity is needed to execute workload that is not time critical: add the capacity needed for that workload.
      - If there is still any left over capacity:
        - Spread the left over capacity proportionally over the LPARs.
  - Translate the capacity allocations into absolute capping values for each logical partition
  - If any of the LPARs profits from the newly allocated values: Allocate the capacities to the logical partition(s)
- The following situations may occur:
  - All logical partitions use less capacity than allocated: No action
  - All logical partitions use the allocated capacity, but only workload that is defined as being not time critical is affected:
    - Send informational message
  - All logical partitions use the allocated capacity and workload that is defined as being time critical is affected:
    - Send warning message
  - If necessary: change the absolute capping values of the logical partitions.

These and other objects, aspects and advantages of the present invention will be better appreciated in view of the drawings and following detailed description of preferred embodiments.

BRIEF DESCRIPTION OF THE DRAWINGS

FIG. 2 is a schematic overview showing that z/OS workload runs in one of the seven WLM importance levels, ranging from the highest level, importance level 0 to the lowest level called 'discretionary';

FIG. 3 is a schematic overview of how the service classes can be allocated to one or more importance levels. If allocated to more than one importance level, the work within the service class is divided up in 'periods', will always start in the highest level and will be moved to the lower levels after having used the predefined capacity for the current level;

FIG. 4 is a schematic overview of allocation of a time criticality level based upon WLM importance levels;

FIG. 5 is a schematic overview of allocation of a time criticality level based upon service class periods;

FIG. 8 is an example showing that based upon the type of hardware (2827-4xx, 2827-5xx, 2827-6xx or 2827-7xx) and upon the number of Central Processing Units (CPUs or "processors") the average capacity in PCI (Processor Capacity Index) and MSU (Millions of Service Units per Hour). PCI and MSU are relative capacity values published by IBM for every zSeries model. The preferred capacity value used by customers is MSU. From the table it is visible that the effective capacity per CPU decreases when the number of CPUs increases;

DETAILED DESCRIPTION OF PREFERRED EMBODIMENTS

As discussed above, the IBM System z platform is the preeminent contemporary example of third party-provided mainframe computer systems and services. Thus, the following description will be couched in terms relevant to this example. However, those skilled in the art will appreciate that the present invention could be applied to determine mainframe computer system billable usage in the case of other computing service providers with analogous billing practices.

The steps of methods described herein, and of claims appended herein, are performed by a computer and necessarily involve the use of computer processor hardware executing program instructions stored in a tangible data storage medium.

Figure 1:
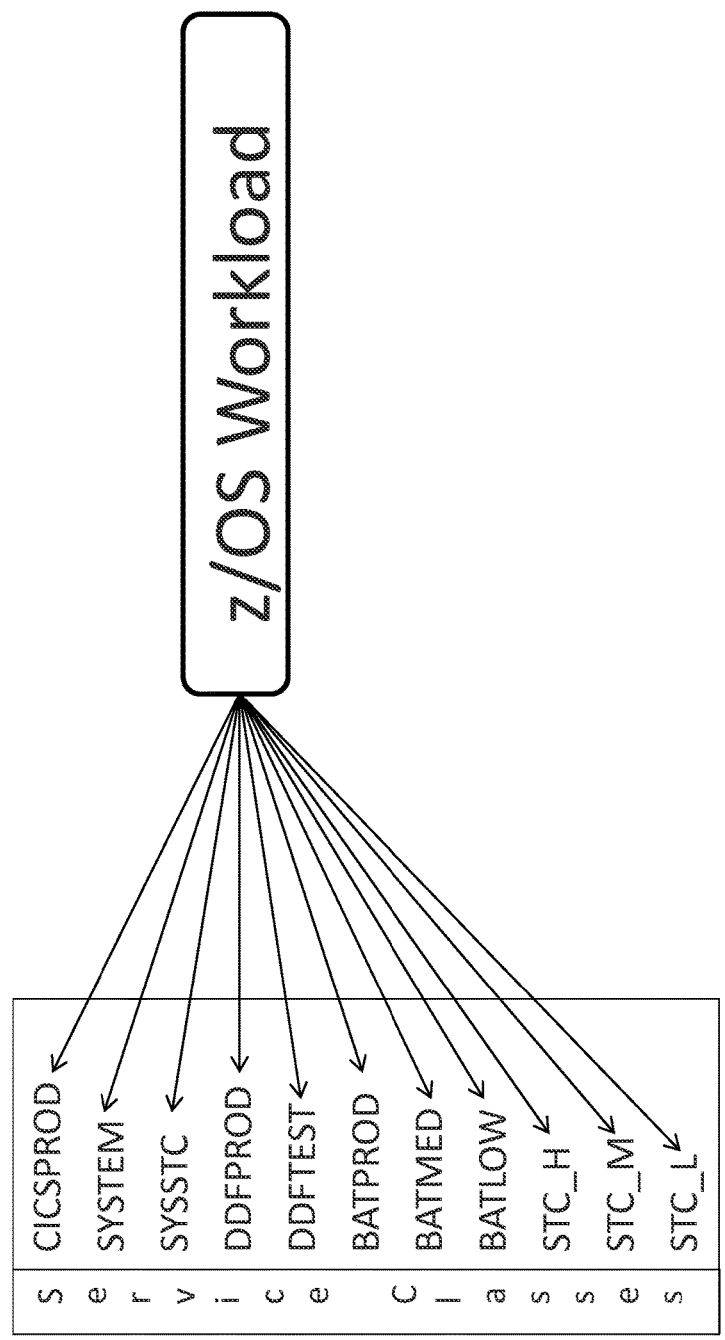
FIG. 1 is a schematic overview of the z/OS workload entering the z/OS environment thru a service class.
Figure 2:
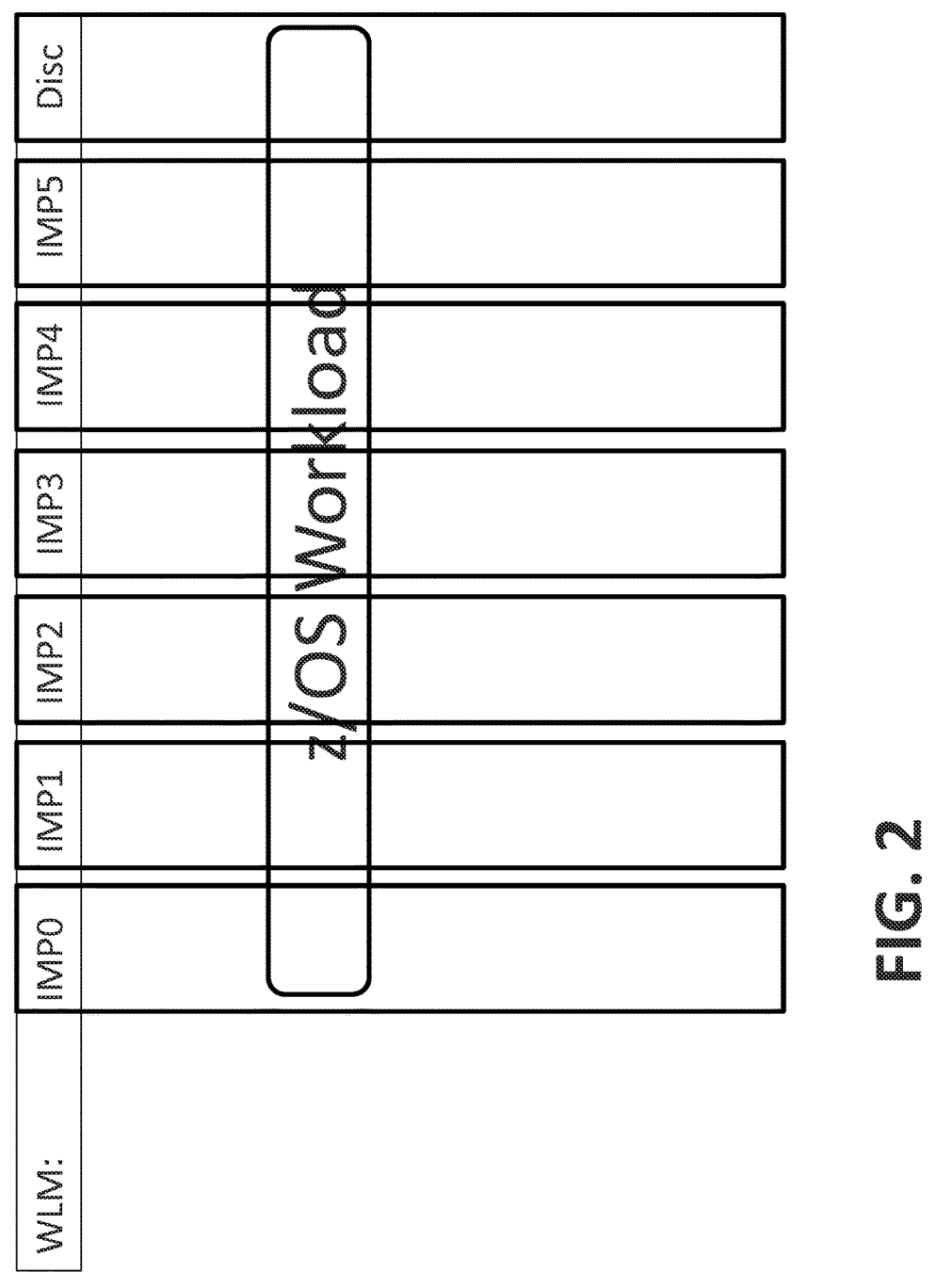

Referring to FIG. 1 the total z/OS workload entering the z platform is divided up into service classes. This is typically done using parameters to allow similar types of workloads to be grouped together. Referring to FIG. 2, the total z/OS workload is controlled by WLM and spread over the WLM importance levels 0 (highest) to Disc (lowest).

Referring to FIG. 3, in an exemplary implementation of mainframe computer system usage, workloads within a plurality of Service Classes are assigned to a plurality of WLM importance levels. Examples of Regions constituting the workload in the different Service Classes are called out, with Report Classes defined to report usage relating thereto.

Referring to FIG. 4, time criticality is designated by assigning a level of time criticality to each WLM importance level. Within this exemplary LPAR WLM importance levels 0, 1, 2, 3 and 4 are indicated as running time critical workloads and WLM importance level 5 and Discretionary are indicated as running workloads defined as Not Time Critical.

Alternately, referring to FIG. 5, time criticality is designated by assigning a level of time criticality to each service class or period thereof. Within this exemplary LPAR, service classes CICSPROD, SYSTEM, SYSSTC and STC_H all have one time critical period only, service class DDFPROD has two time critical periods, DDFTEST, BATPROD, BATMED, BATLOW and STM_M have two periods, the first one time critical, the second period not time critical and STC_L has two periods, both not time critical.

Figure 6:
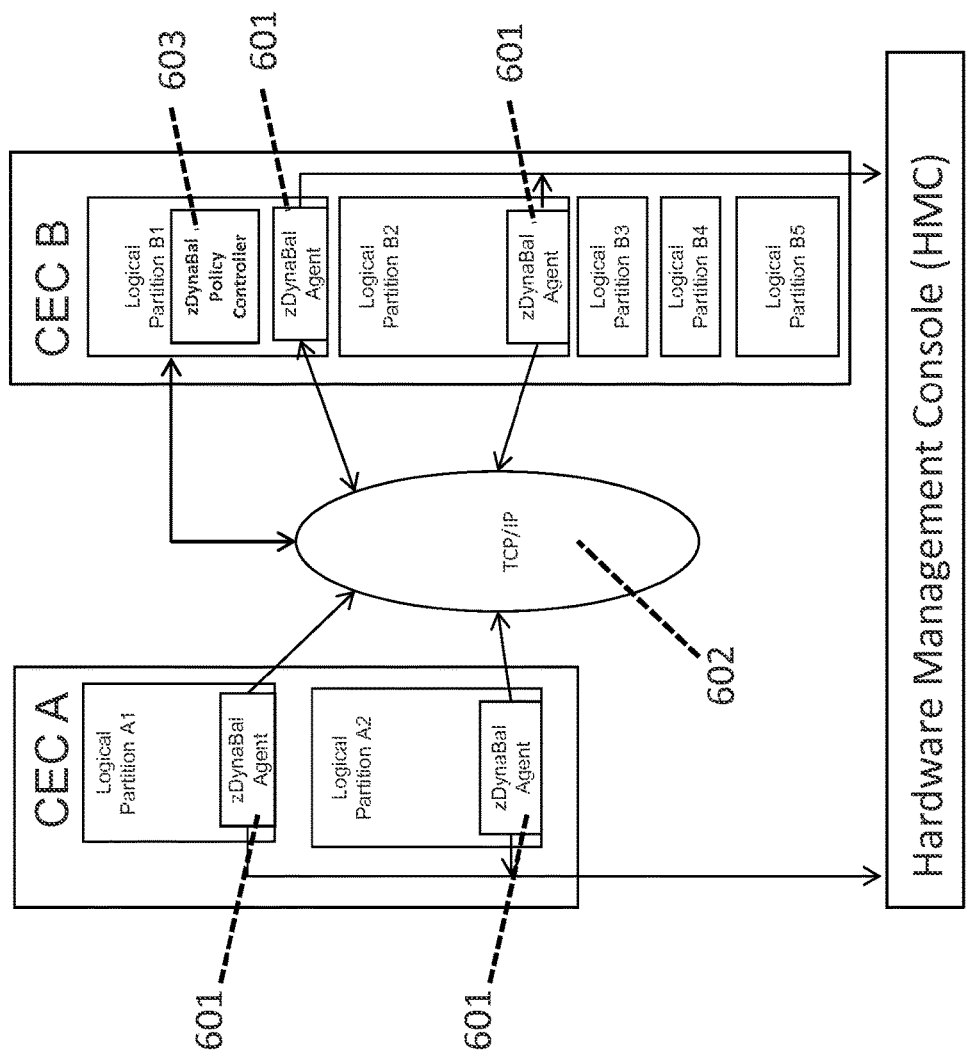
FIG. 6 is a schematic overview of a system for managing actual (current) mainframe computer usage, including a policy controller and a plurality of agents installed in logical partitions belonging to one customer, executed by central electronic complexes (CECs) of a mainframe computer system, and communicating with a hardware management console thereof, according to an embodiment of the present invention.

Referring to FIG. 6, on each logical partition (LPAR) that belongs to one customer an agent 601 is installed. The agent 601 collects LPAR usage data and sends this data via TCP/IP protocol via network 602 to the policy controller 603. The controller 603 uses the gathered LPAR usage information, the user defined parameters and the user defined policies to forecast the actual usage capacity requirements for the next period. When changes to the absolute capacity settings are indicated, the policy controller 603 sends a message to the agent 601 involved, again using the network 602. The agent or agents 601 that receive a message involving changes to the current absolute capping settings initiate the changes by sending off a command using either the simple network management protocol (SNMP) or the base control program internal interface (BCPii), both of which are integrated parts of the z/OS operating system.

Figure 7:
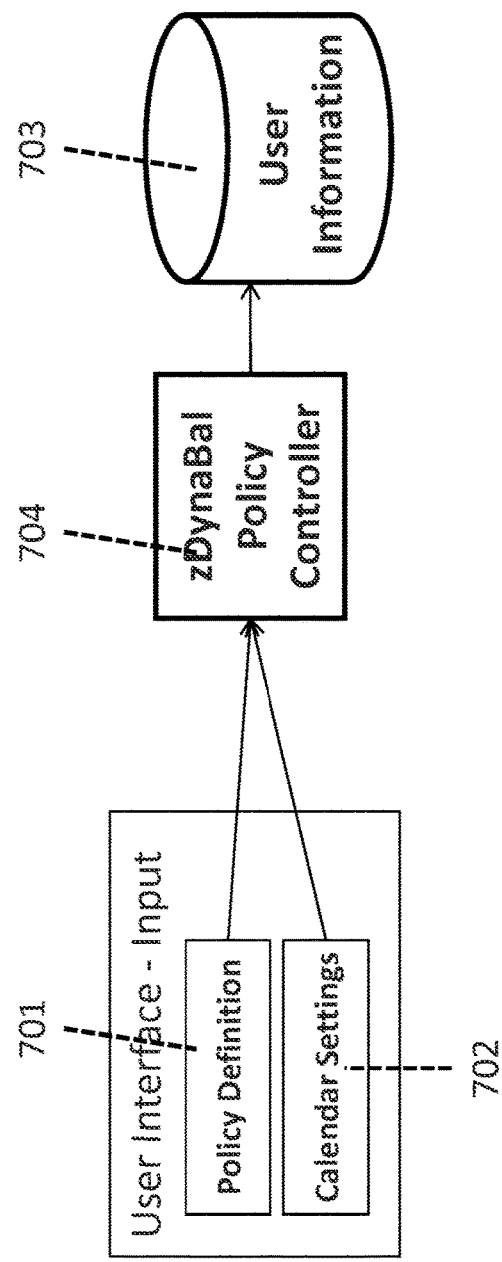
FIG. 7 is a schematic overview of a user interface through which definitions and scheduling criteria are received by the system and stored.

Referring to FIG. 7, different policy and parameter definitions are defined using a User Interface. These definitions include Policy definitions 701 (also refer to FIGS. 10 and 11): One or more policies are defined using the user interface. Within the policy all the information that the controller needs is defined: scheduling criteria (e.g. calendar data and time of day ranges), MSU capacity ranges per group, subgroups and LPARs and the level of time criticality of each of the WLM importance levels or each of the Service Class periods of each of the LPARs.

Calendar settings 702: Policies contain a validity period and can be defined for certain hours, weekdays, weekends, business or non-business days.

Each policy is stored in the policy database 703 by the policy controller 704.

Referring to FIG. 8, in the depicted example, it can be seen how the MSU capacity per Central Processing Unit (CPU) decreases when the number of CPUs of a CEC increases: the increase of capacity is not necessarily linear to the number of CPUs. The example also shows the significance of different processor hardware types. This information is publicly made available by IBM and is called the Large System Performance Reference (LSPR) and is generally used as the performance reference table.

Figure 9:
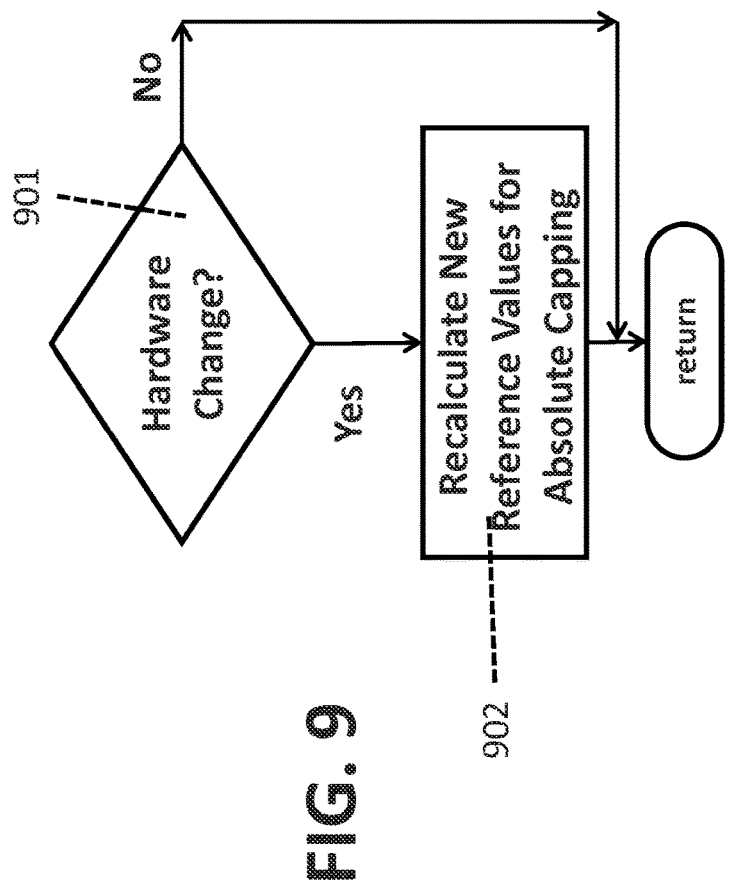
FIG. 9 is a schematic overview of the permanent monitoring that needs to be done in regard to the hardware set up: temporary upgrades of the hardware are possible and indeed normal and will lead to different reference values for absolute capping.

Referring to FIG. 9, a flow chart indicates how any permanent or temporary change in hardware 901 leads to a change in reference values for absolute capping 902, as is illustrated by the values in the table in FIG. 8.

Figure 10:
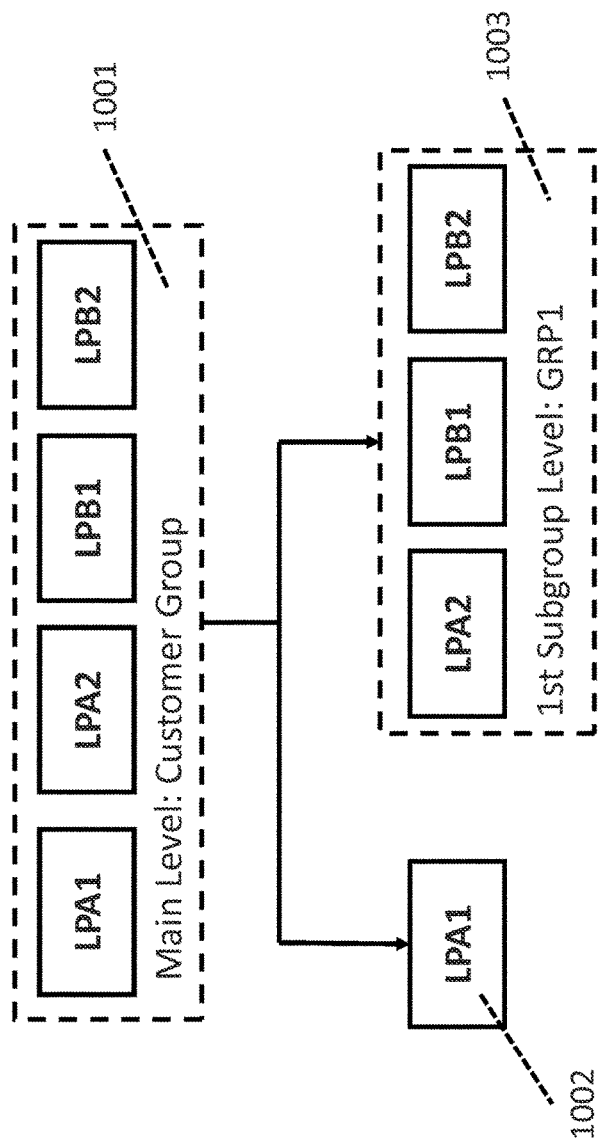
FIG. 10 is a schematic illustration of a customer group definition, including a group that includes a subset of the logical partitions.

Referring to FIG. 10, an example of a customer group definition 1001 is shown that is divided into 4 LPARs (LPA1, LPA2, LPB1, LPB2). The customer group 1001 is the main level, which is divided up into one singular LPAR 1002 (LPA1) and a sub group 1003 (GRP1) with LPA2, LPB1 and LPB2.

Figure 11:
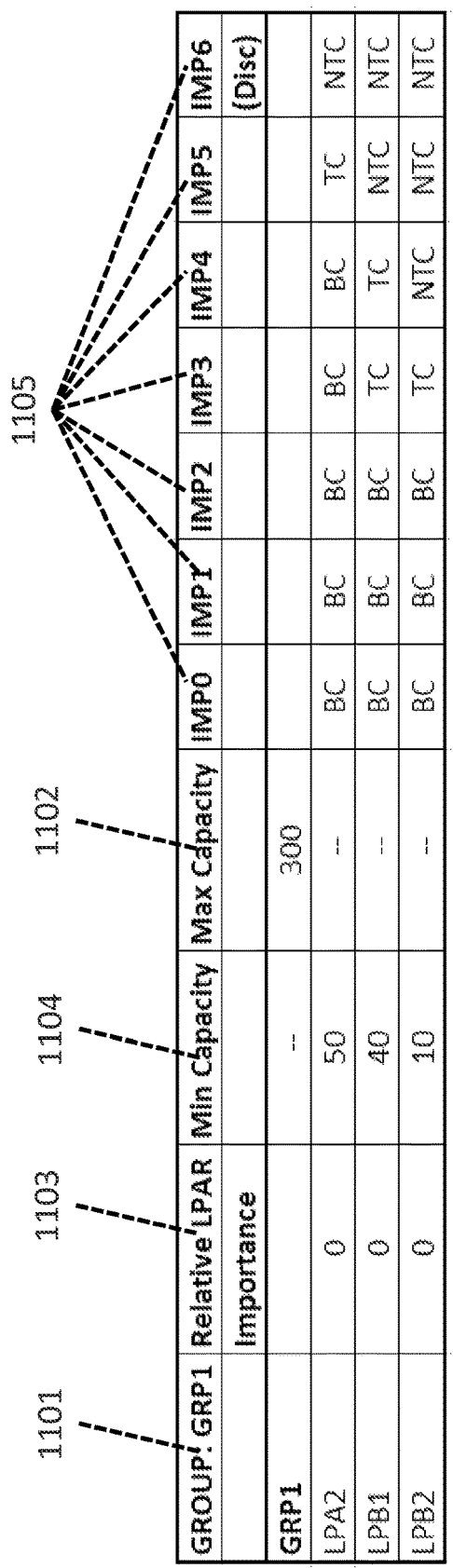
FIG. 11 is a schematic illustration of group policy definitions for an exemplary group of FIG. 10, including group upper actual processing capacity threshold, relative LPAR importance parameter values, minimum capacity guarantee for each LPAR and level of time criticality per WLM importance level: here illustrated with 3 levels: Business Critical (BC), Time Critical (TC) and Not Time Critical (NTC)

Referring to FIG. 11, an example of a possible policy definition 1101 for sub group GRP1 is illustrated. The actual or current maximum processing capacity 1102 of the group may not exceed 300 MSU at any time. The LPARs that belong to the group show a relative importance 1103, here all identical, meaning that none of the LPARs is defined as being more critical and capacity balancing (see FIG. 15) is done. Should the relative importance 1103 definitions differ, capacity reallocation (see FIGS. 16a, 16b and 16c) is done.

A minimum actual or current processing capacity 1104 can be defined for each LPAR.

In this example the WLM importance levels 1105 are categorized in three categories: Business Critical (BC), Time Critical (TC) and Not Time Critical (NTC), representing the categorization as described in FIG. 4. Instead of categorizing the level of time criticality per WLM importance 1105, the categorization of the time criticality can be done per Service Class period (see FIG. 5).

Figure 12:
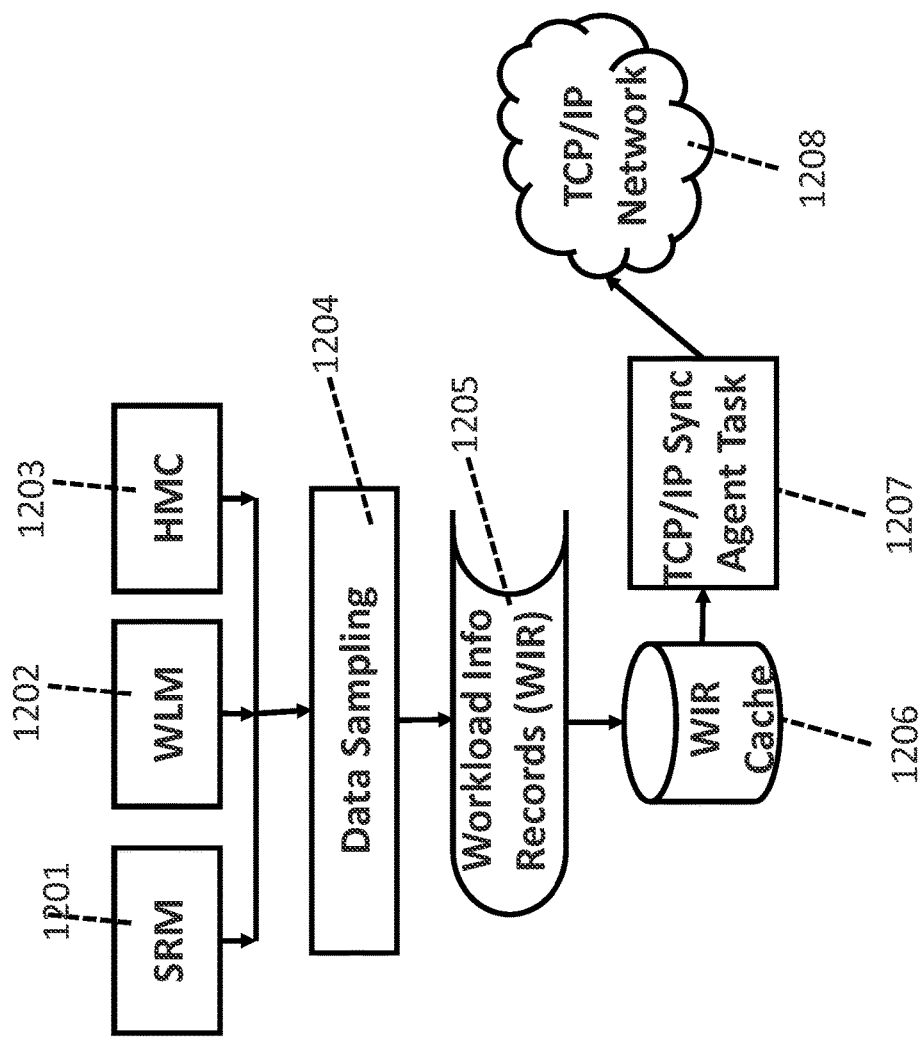
FIG. 12 is a flow diagram of the data collection process undertaken by the agents of FIG. 6.

Referring to FIG. 12, the agent data collection process within an LPAR is shown. The agent monitors the actual or current consumption of processing capacity periodically by the WLM importance levels or Service Class periods. The most recent consumption values are gathered using the available standard interfaces to part of the "z/OS" operating system, such as the System Resource Manager (SRM) 1201 and the Workload Manager (WLM) 1202. In addition, the Hardware Management Console (HMC) 1203 is used to obtain the current settings for the LPAR. The collected actual consumption values are then filtered and merged 1204, resulting in a workload information record (WIR) 1205 holding the relevant information that is used for the upcoming projections and other determinations. The workload information record 1205 is stored in a local cache 1206. The TCP/IP synchronization agent task 1207 is invoked to transport the workload information record using the TCP/IP Protocol network 1208 to the policy controller.

Figure 13:
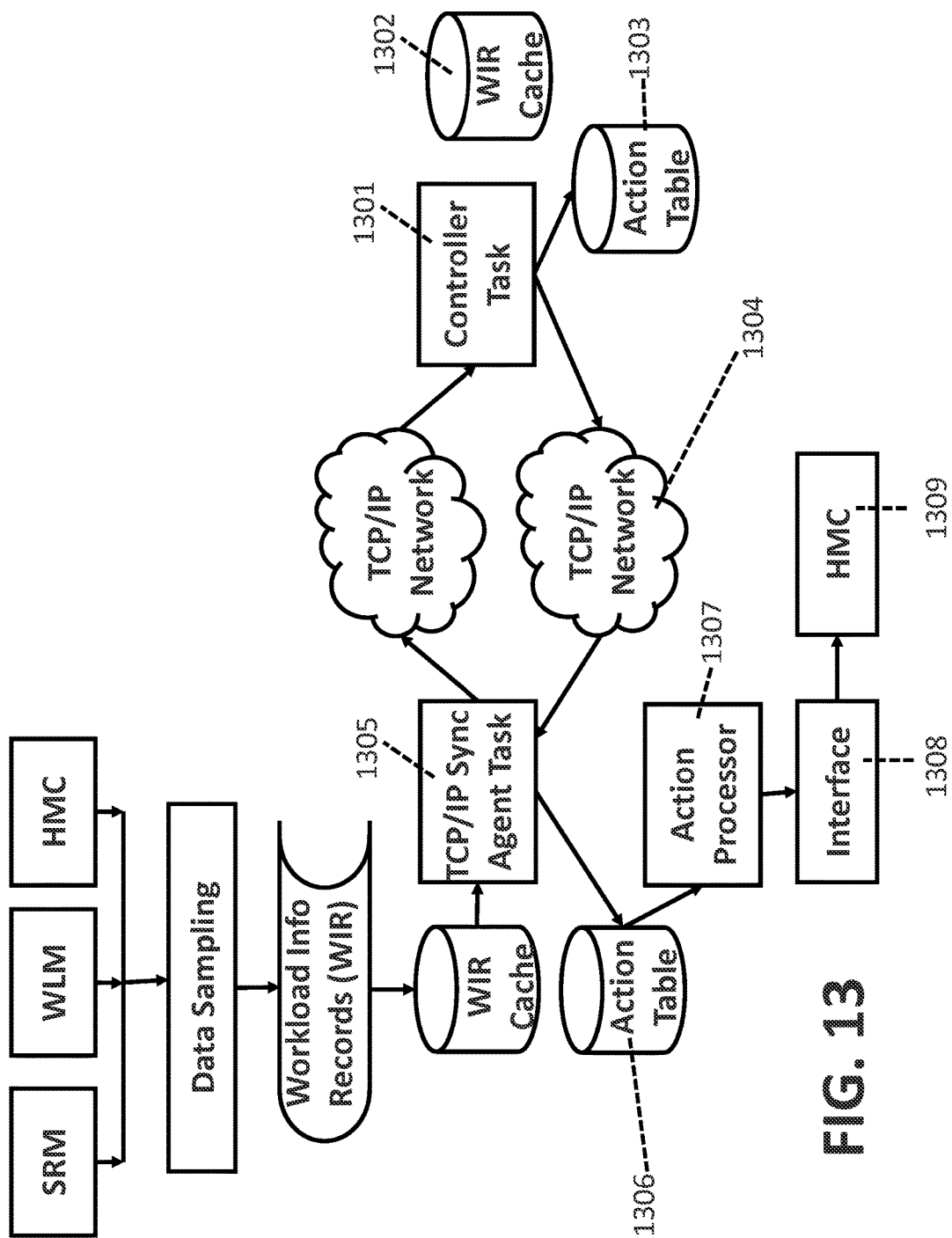
FIG. 13 is a flow diagram of operations of the policy controller of FIG. 1, including capacity projection determination and capacity adjustment.

Referring to FIG. 13, the data collection process of an agent within a logical partition which has been specified in FIG. 12 is shown, together with the interaction with the policy controller 1301 and the handling of actions to be performed after receiving assignments from the controller. As illustrated in FIG. 6, the controller task may run on the same or another LPAR as the agent. If consumption data has been sent from an agent, the controller picks up the workload information record 1302 and periodically starts the projection and balancing or reallocation decision processing. The next step is to store the action that needs to be taken by the affected LPAR into the controller's action table 1303 and transmit the information via TCP/IP network 1304 to the agent. After the TCP/IP synchronization agent 1305 detects a message from the policy controller, the action that needs to be taken is written into the agent's action table 1306 and passed to the action processor 1307. The purpose of the action processor is to request the execution of the command; for example, using an operating system z/OS interface 1308 (such as SNMP or BCPii) to access the Hardware Management Console 1309.

Figure 14:
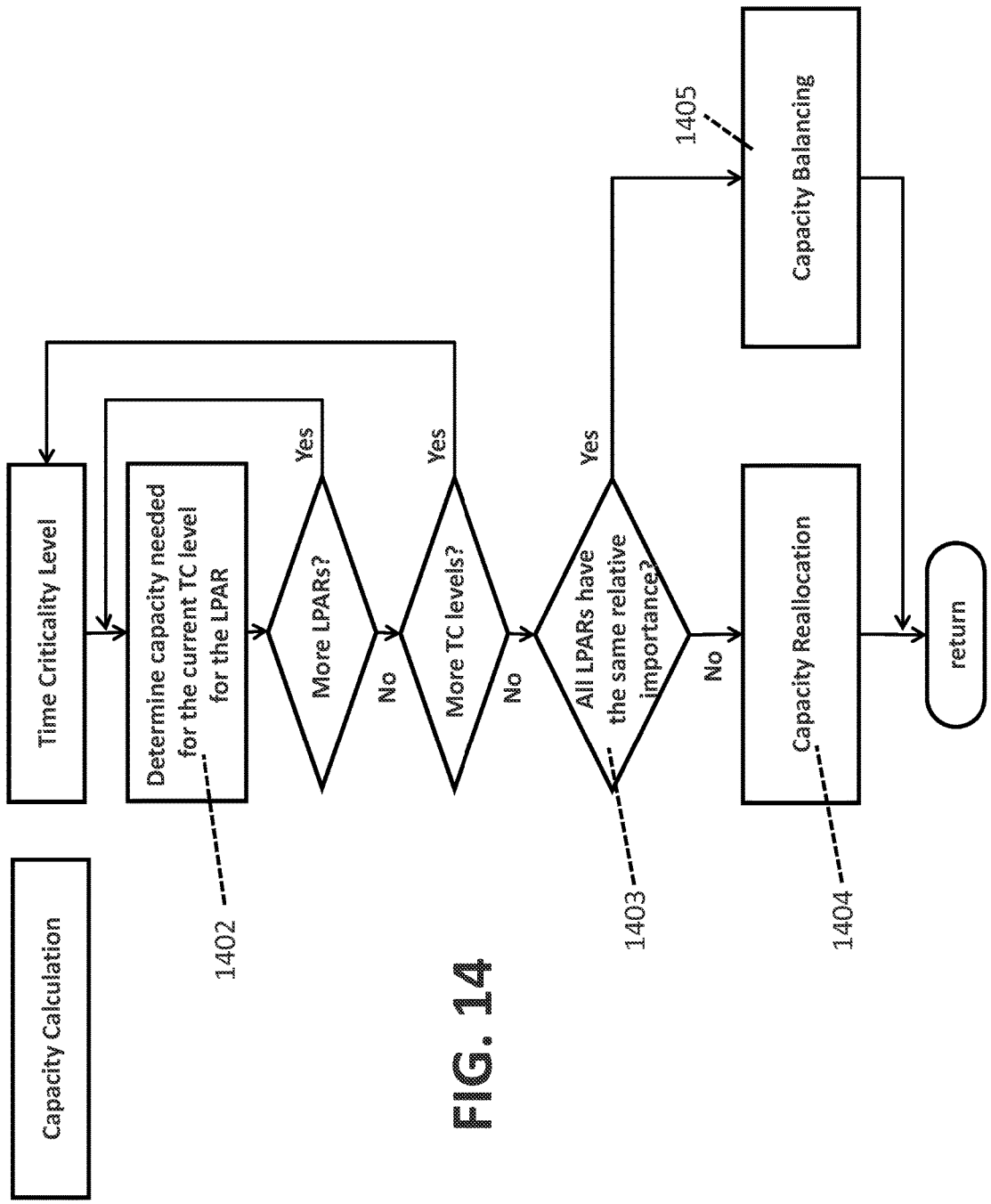
FIG. 14 is a detailed flow diagram of the capacity projection and determination.

FIG. 14 shows the logical flow chart for the capacity calculation. In a recurring iteration per level of time criticality 1401 it is determined for each LPAR how much capacity is actually (currently) needed 1402 to execute the time critical workload. Subsequently it is determined if all LPARs have the same relative importance 1403. If that is not the case capacity reallocation 1404 is done, if that is the case, capacity balancing 1405 is done.

Figure 15:
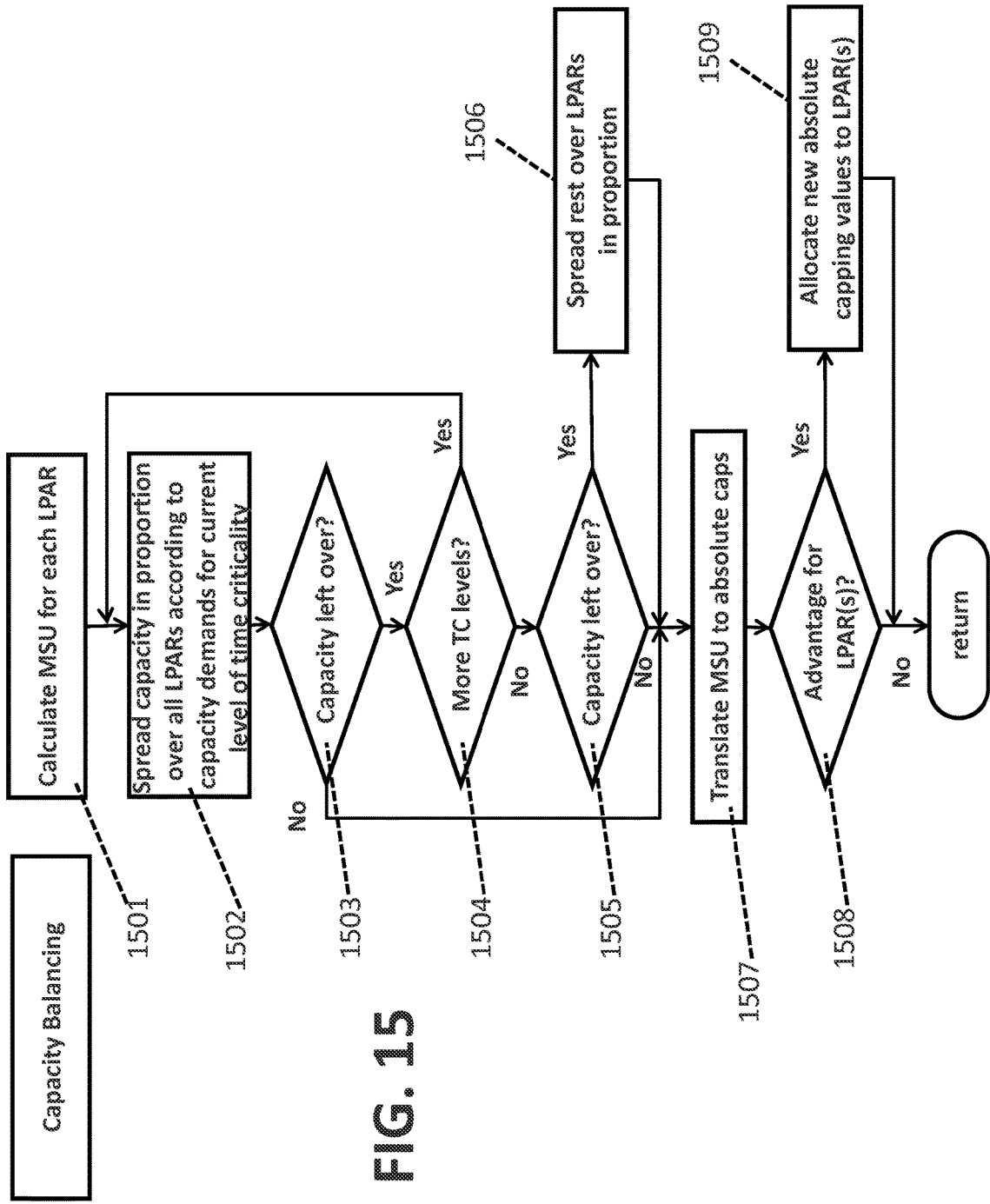
FIG. 15 is a detailed flow diagram of the capacity projection done when all LPARs have the same relative importance.

FIG. 15 shows the logical flow chart for the calculation of the capacity for each LPAR when capacity balancing is done (see FIG. 14). For each LPAR the determination is made of how much actual or current capacity is needed within the next period to do the time critical and not time critical workloads 1501. This is done through extrapolation of the actual or current usage of the last maximum 60 minutes into the next period. For each level of time criticality, starting with the highest, the available capacity is allocated to each LPAR 1502. If there is not enough capacity left for all the expected workloads, the available capacity is spread over the LPARs in proportion to their actual or current capacity needs and the iteration is stopped 1503. If after allocating the actual or current capacity over all levels of time criticality 1504 and there is still capacity left over 1505, that capacity is spread over the LPARs in proportion of their actual or current usage 1506. The newly calculated MSU values are translated into absolute capping values 1507. These values are compared to the current settings 1508, if the new values offer substantial differences or advantages for the LPARs of a group, the new absolute capping values are activated.

Figure 16A:
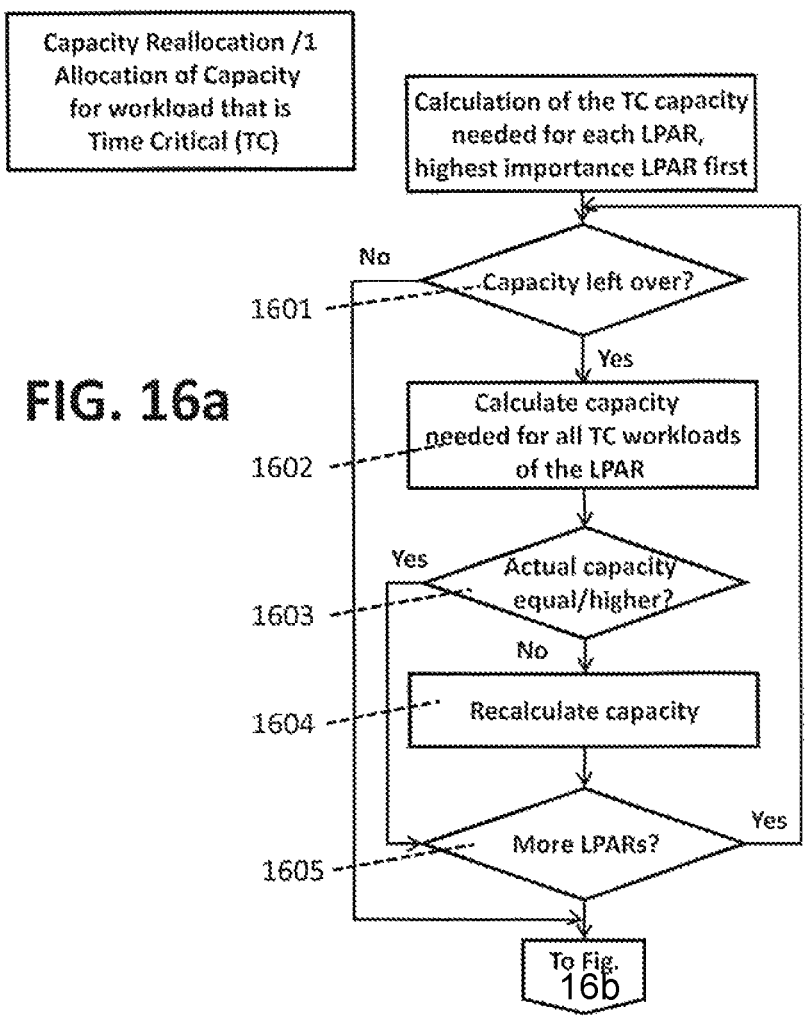
FIG. 16a is a detailed flow diagram of the part of the capacity projection for TC (Time Critical) workloads (this includes workloads of all levels of time criticality except Not Time Critical workloads) done when LPAR relative importance values differ.

FIG. 16a shows the flow chart for the first step of the calculation of the capacity for each LPAR when capacity reallocation is done (see FIG. 14). While there is capacity left over 1601, starting with the LPAR with the highest relative priority, extrapolation is done to determine how much capacity is needed to execute at least all time critical workloads 1602. If the actual capacity that is allocated to the LPAR is lower than the newly calculated minimum capacity value for the next period 1603, more capacity needs to be allocated to the LPAR: the new capping value needs to be calculated 1604. This calculation continues until one of the two situations occurs: there is no more capacity left 1601 or the calculation has been done for all LPARs 1605.

Figure 16B:
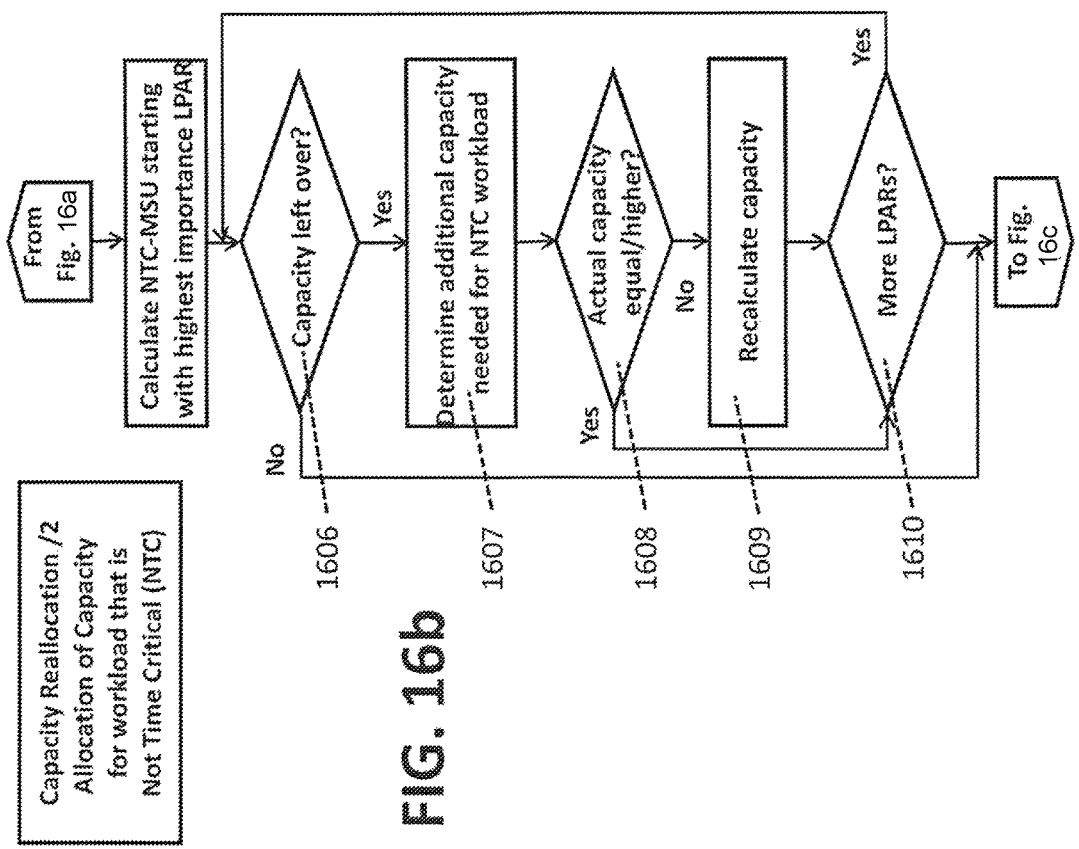
FIG. 16b is a detailed flow diagram of the part of the capacity projection for NTC (Not Time Critical workload done when LPAR relative importance values differ.

FIG. 16b shows the flow chart for the second step of the calculation of the capacity for each LPAR when capacity reallocation is done (see FIG. 14). While there is capacity left over 1606, starting with the LPAR with the highest relative priority, extrapolation is done how much capacity is needed to execute the workload that is defined as Not Time Critical 1607 also. If the actual capacity that is allocated to the LPAR is lower than the newly calculated capacity value for the next period 1608, more capacity will be allocated to the LPAR: the new capping value needs to be calculated 1609. This calculation continues until one of the two situations occurs: there is no more capacity left 1606 or the calculation has been done for all the LPARs 1610.

Figure 16C:
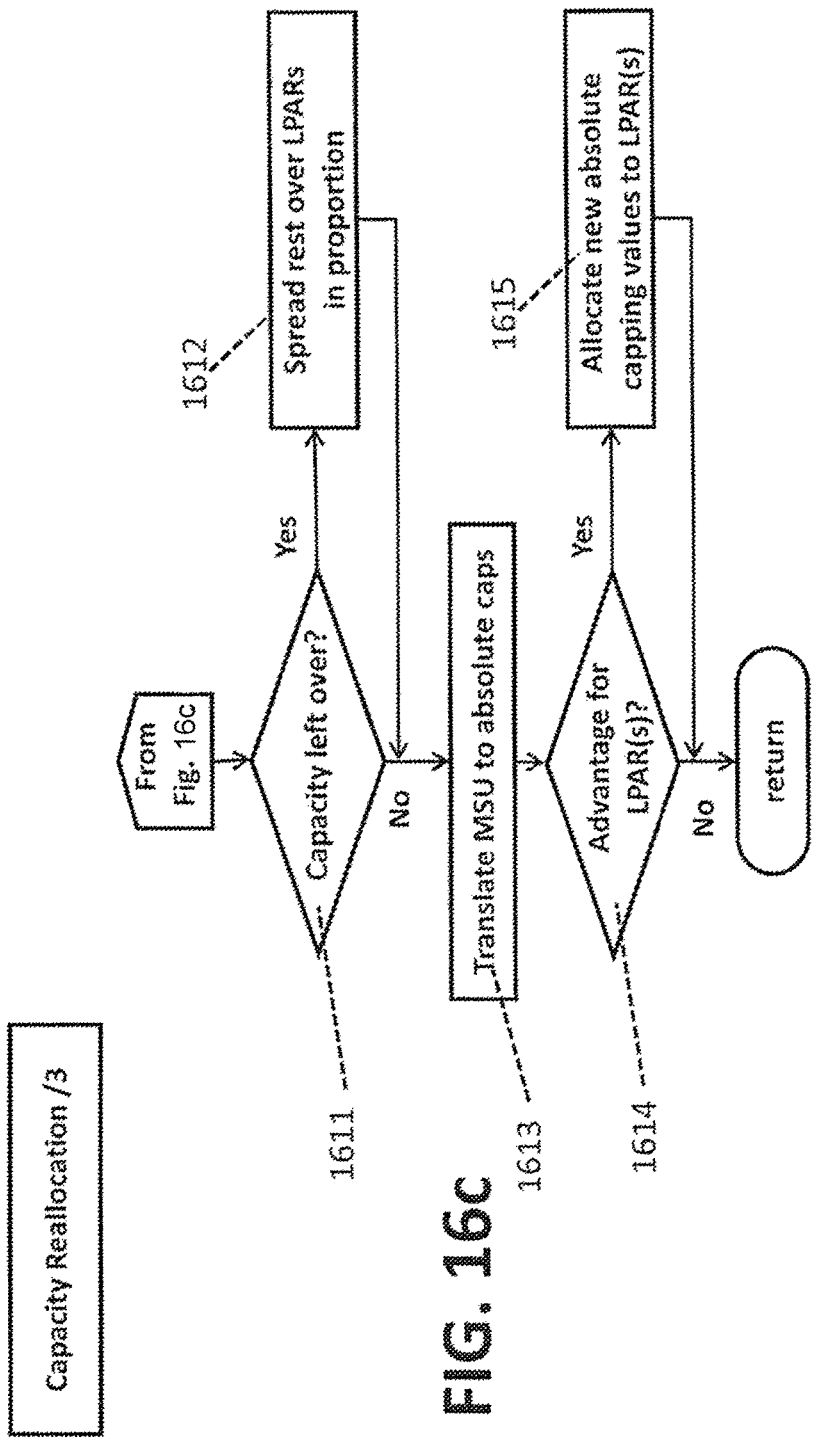
FIG. 16c is a detailed flow diagram of the part of the capacity projection that spreads excess capacity proportionally over the LPARs.

FIG. 16c shows the flow chart for the third step of the calculation of the capacity for each LPAR when capacity reallocation is done (see FIG. 14). If there is still capacity left after allocating the capacity demands for time critical and not time critical workloads 1611, the available excess capacity is spread over all LPARs in proportion of their actual usage 1612. The newly calculated MSU values are translated into absolute capping values 1613. These values are compared to the current settings 1614, if the new values offer substantial differences or advantages for the LPARs of a group, the new absolute capping values are activated 1615.

The above embodiments are provided for exemplary and illustrative purposes. Those skilled in the art will appreciate that the present invention is not necessarily limited to such embodiments. Rather, numerous modifications, as well as adaptations for particular circumstances, will fall within the scope of the invention as herein shown and described and of the claims appended hereto.

The invention claimed is:

1. A method for managing actual, current customer group capacity usage on a mainframe computer system, the method comprising:
   establishing a customer group definition, the customer group definition including first and second logical partitions executed by the mainframe computer system;
   establishing a first group policy, the first group policy including first and second partition processing capacity limits for actual, current mainframe capacity usage and a time criticality level for each of a plurality of workload tasks assigned to the first and second logical partitions, first and second partition processing capacity limits being measured in fractions of processors used;

monitoring performance of the first and second logical partitions in executing the plurality of workload tasks to determine processing capacity needs for the plurality of workload tasks, the processing capacity needs being measured in millions of service units (MSU), the performance monitoring also including determining if a hardware change has occurred resulting in a change of one or more hardware processors being used to by the first and second logical partitions;

based on the performance monitoring and the first and second group policies, reallocating processing capacity in MSU between the first and second logical partitions to ensure all time critical workload tasks have sufficient processing capacity;

translating the reallocated processing capacity needs from MSU into fractions of processors used taking into account the determination if the hardware change has occurred; and adjusting the first and second partition processing capacity limits for actual, current mainframe capacity usage based on the translated processing capacity needs;

wherein the performance monitoring, reallocation, translation and adjusting are performed iteratively at a predetermined interval.

2. The method of claim 1, wherein establishing the first group policy includes checking scheduling criteria and selecting the first group policy from a plurality of stored first group policies based thereon.

3. The method of claim 2, wherein the scheduling criteria include at least one of a data and a time of day.

4. The method of claim 1, wherein reallocating processing capacity in MSU between the first and second logical partitions to ensure all time critical workload tasks have sufficient processing capacity includes projecting future processing capacity requirements for the plurality of workload tasks.

5. The method of claim 4, wherein establishing the first group policy further includes establishing first and second logical partition projection models for projecting future processing capacity requirements for the plurality of workload tasks.

6. The method of claim 5, wherein the first and second logical partitions projection models are established based on the time criticality level of the workload tasks.

7. A non-transitory tangible data storage medium encoded with program instructions to perform the method of claim 1 when executed by a computer system.

* * * * *